United States Patent [19]

Kameyama et al.

[11] 3,990,106

[45] Nov. 2, 1976

[54] DYNAMIC NEGATIVE PRESSURE TYPE FLOATING HEAD SYSTEM

[75] Inventors: Yukio Kameyama, Hino; Hitoshi Masuko, Sagamihara; Yasuo Matsumoto, Tokyo; Masaru Sakata, Yokohama, all of Japan

[73] Assignees: Nippon Hoso Kyokai, Tokyo; Masaru Sakata, Yokohama, both of Japan

[22] Filed: May 30, 1975

[21] Appl. No.: 582,447

[52] U.S. Cl. .............................. 360/103; 360/105; 360/106; 360/109
[51] Int. Cl.² .................... G11B 5/54; G11B 21/22; G11B 21/20; G11B 5/60
[58] Field of Search ............ 360/103, 105, 106, 109

[56] References Cited
UNITED STATES PATENTS

| | | | |
|---|---|---|---|
| 3,488,648 | 1/1970 | Church | 360/103 |
| 3,665,434 | 5/1972 | Applequist et al. | 360/103 |
| 3,720,932 | 3/1973 | Perkins et al. | 360/103 |
| 3,754,104 | 8/1973 | Piper et al. | 360/103 |
| 3,823,416 | 7/1974 | Warner | 360/103 |
| 3,855,625 | 12/1974 | Garnier et al. | 360/103 |

*Primary Examiner*—Robert S. Tupper
*Attorney, Agent, or Firm*—Stevens, Davis, Miller & Mosher

[57] ABSTRACT

A dynamic pressure type floating head system comprising a floating magnetic head, a magnetic recording medium which stores information to be recorded and a resilient member for supporting the magnetic head. The floating head comprises a first flat surface portion of a sliding surface and a second flat surface portion having embedded therein a plurality of projections on the same plane. The attractive force caused by the viscous flow generated between the first surfaces by the relative movement of the surface to be recorded is combined with the holding force caused by the slip flow generated between the second surfaces so that the floating gaps are narrowed. The relative speed between the floating head and the surface to be recorded, the relationships between gaps, and operations of the approaching stroke to a floating position and of the separating stroke from the floating position exhibit a hysteresis characteristic, so that the magnetic recording and reproducing device requires no protective device for protecting contact between the floating head and the magnetic surface to be recorded.

4 Claims, 25 Drawing Figures

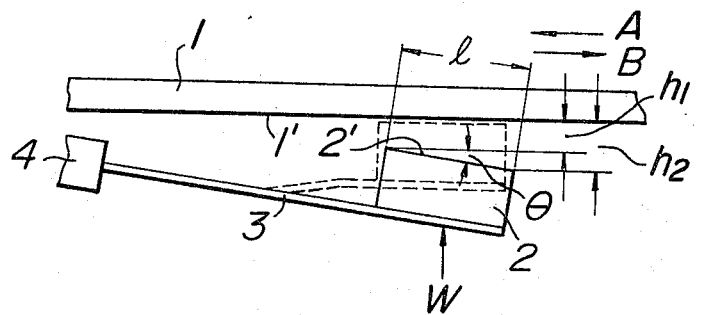
FIG._1a
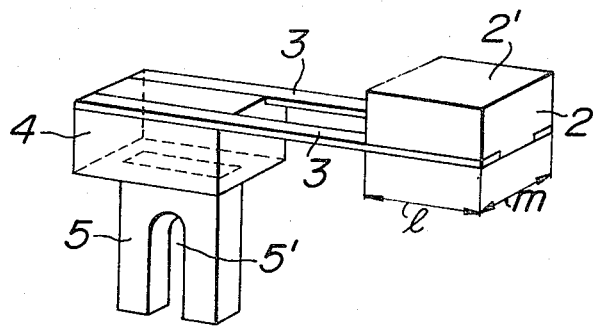
FIG._1b
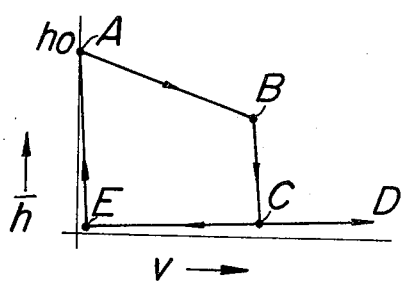
FIG._2
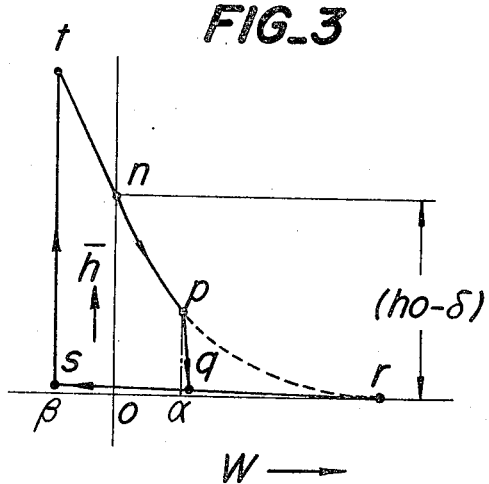
FIG._3

FIG._4
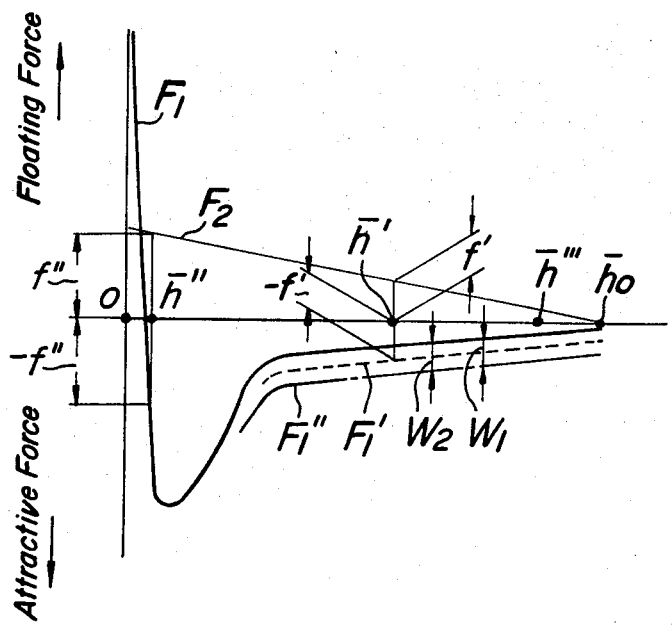
FIG._5
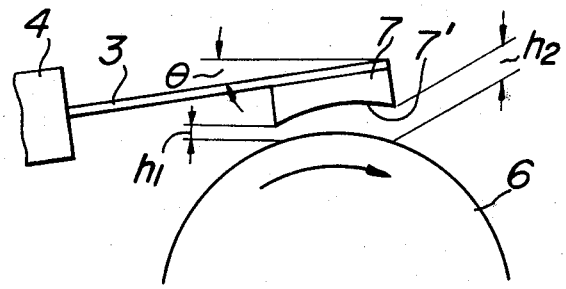

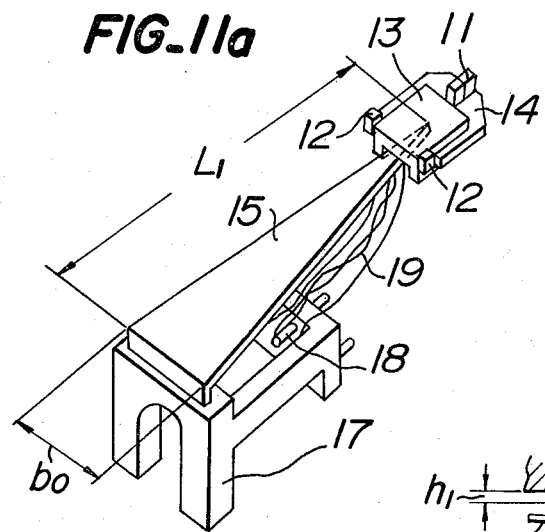
FIG._11a
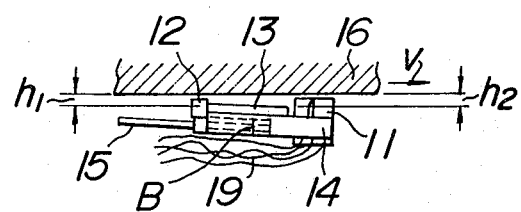
FIG._11b
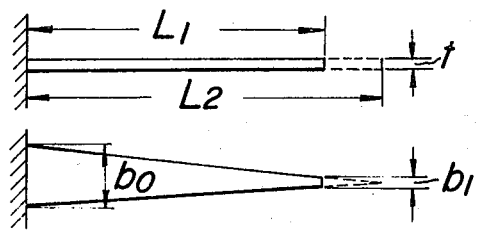
FIG._12
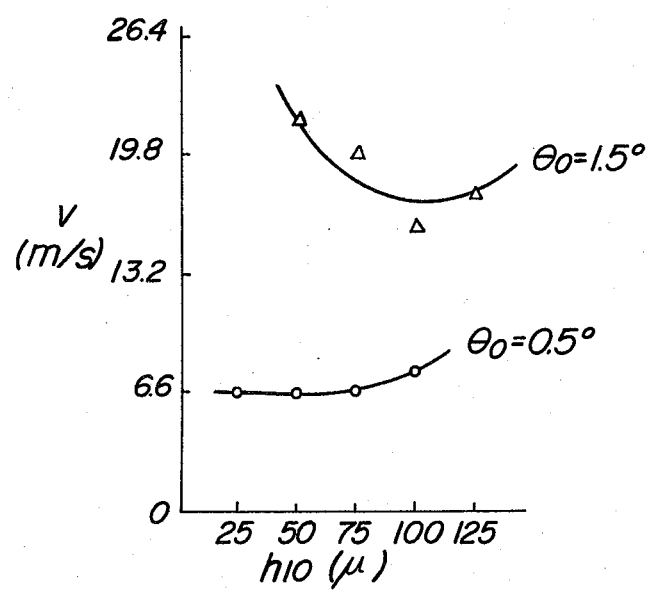
FIG._9

FIG_10a
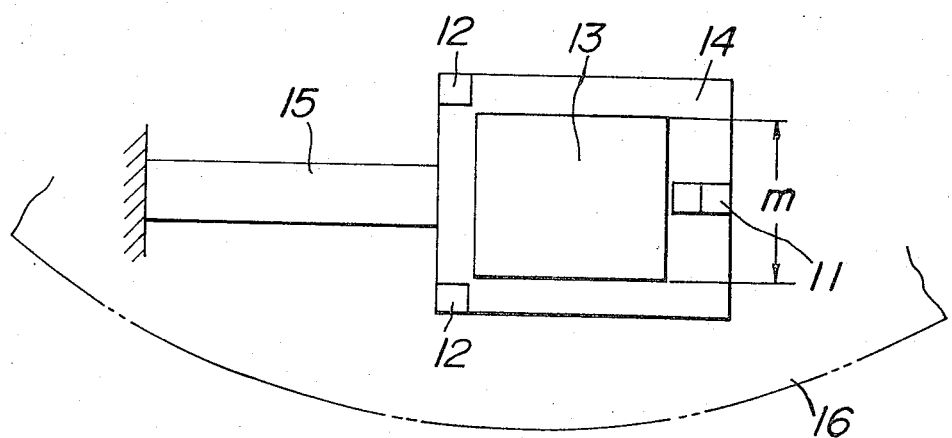
FIG_10b
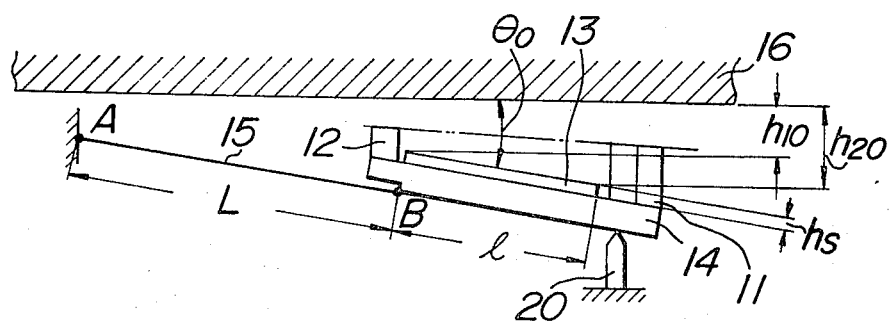
FIG_10c
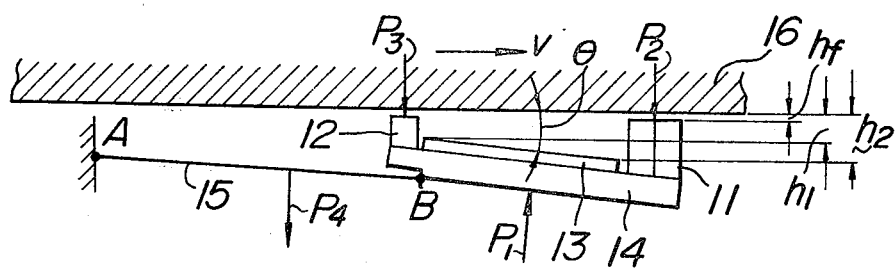

FIG_13a
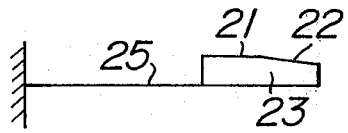
FIG_13b
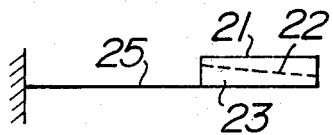
FIG_13c
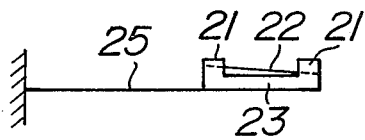
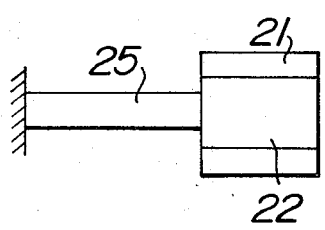
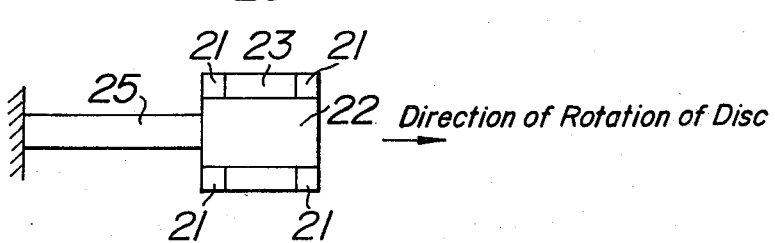
Direction of Rotation of Disc →
FIG_14
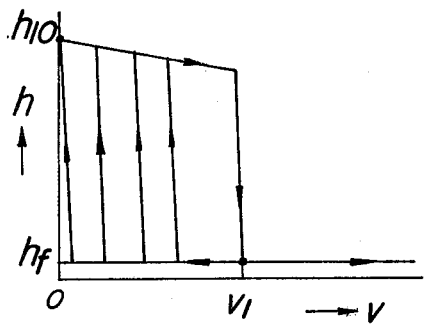

DYNAMIC NEGATIVE PRESSURE TYPE FLOATING HEAD SYSTEM

This invention relates to a dynamic pressure type floating head system used for a magnetic recording device or the like, particularly a self-protective floating head system for recording a video frequency band signal or the like by maintaining a slight gap between the floating head and a surface to be recorded of a magnetic recording medium, but requiring no protective device for protecting mutual contact between the floating head and the surface upon resting and starting of the system.

The known floating head system of the dynamic pressure type used in a magnetic disc or the like has such disadvantage that, since a fluid pressure is low upon starting and resting of the head system the floating head is usually in contact with the surface to be recorded of the recording medium and the head system cannot be used for a long period of time.

Therefore, one has been obliged to use a holding mechanism for the head by utilizing electromagnetic force, centrifugal force, air pressure or the like in relation to the relative movement of the head and the surface to be recorded of the recording medium, but this holding mechanism makes the whole of the magnetic recording device mechanically and electrically complicated and lowers reliability thereof.

A conventional floating head device having the aforementioned holding mechanism has about 0.5 $\mu$m of a floating gap between the floating head and the surface to be recorded and cannot record with high density which requires decreasing the floating gap.

Because, the floating head is utilized for the buffer memory for an electronic computer it is required to automatically switch the positions of the floating head and to improve recording capability.

An object of the present invention is to provide a self-protective type floating head system in which signals of the video frequency band are recorded and regenerated with stability by maintaining a floating gap of less than 1 $\mu$ during operation, and the protective function upon starting and resting of the head system simple construction and high reliability are provided.

Another object of the present invention is to provide a self-protecting type floating head system which makes the high density recording possibly by combining a hydrodynamic viscous flow region in relation to the relative movement between the surface to be recorded and the floating head with a pressure generating phenomenon in a ship flow region, so as to further close the floating gaps to each other.

Another object of the present invention is to provide a magnetic recording device having a driving device for moving the floating head parallel to the surface to be recorded, to increase the recording capacity.

The aforesaid objects are accomplished by a dynamic pressure type floating head system for holding the sliding surface of a magnetic head in a the non-contact state against a surface to be recorded of a magnetic recording medium, wherein the sliding surface of the magnetic head is so inclined and arranged that a wedge-shaped gap is formed to extend in the direction of rotation of the surface to be recorded, the action of the approaching stroke of the floating head from the initial position to the floating position by the relative movement with the surface to be recorded and the action of the separating stroke from the floating position to the initial position of the floating head exhibit a hysteresis characteristic by corresponding to the change of relative speed of the floating head and the surface to be recorded. As a result, the present invention is of a self-protective type which can only move the floating head from the initial position to the floating position by hydrodynamic action without requiring any protective mechanism for protecting contact of the floating head with the surface to be recorded.

The floating head is formed with a first surface portion of the sliding surface and a second surface portion having embedded therein a plurality of projections on the same surface, and the attractive force due to the viscous flow generated between the first surfaces by the relative movement of the surface to be recorded is combined with the holding force due to the slip flow generated between the second surfaces, so that the floating gaps are narrowed.

According to the invention the, relative speed between the floating head and the surface to be recorded, the relationship between gaps, and actions of the approaching stroke to a floating position and the separating stroke from a floating position exhibit a hysteresis characteristic, so that the magnetic recording device requires no protective device for protecting contact between the floating head and the magnetic surface to be recorded.

The floating gaps are closer to each other by combining attractive force based on a hydrodynamic viscous flow generated in relation to the relative movement between the floating head and the surface to be recorded with holding force based on a hydrodynamic slip flow.

In the invention, provision is made of a driving device for moving the floating head and the surface to be recorded in parallel, to improve the information recording capability.

The invention can further improve the recording function by coupling a aforementioned floating head to the driving device rapidly moved to the surface to be recorded in the horizontal direction to make random access action possible.

Now, the present invention will be explained in detail with reference to the accompanying drawings in which:

FIG. 1A is a side view showing an embodiment of a floating head system according to the present invention;

FIG. 1B is a perspective view of the floating head system shown in FIG. 1A;

FIGS. 2–4 are operational views of the floating head system according to the invention shown in FIG. 1;

FIG. 5 is an explanatory view showing another embodiment of the floating head device according to the invention;

FIGS. 6a and 6b through 8 are explanatory views for the purpose of obtaining the necessary conditions in order to make the floating head system shown in FIG. 1 a self-protective type;

FIG. 9 is a graph showing a result of the experiment carried out by constructing the system according to the invention in detail;

FIGS. 10A, 10B and 10C are perspective and side views showing another embodiment of the floating head system according to the invention;

FIGS. 11A and 11B are perspective and side views showing another embodiment of the construction shown in FIG. 10 in detail;

FIG. 12 is a side view showing one embodiment of a leaf spring used in the floating head system according to the invention;

FIGS. 13A, 13B and 13C are side views showing various modified embodiments of the floating head system according to the invention;

FIG. 14 shows operational characteristics of the floating head system according to the invention;

Figure 6A:
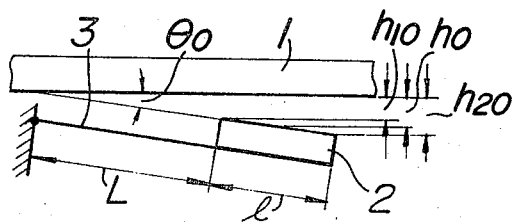

The basic construction of the floating head system according to the present invention will first be explained with reference to the accompanying drawings.

FIG. 1A shows a side view of one embodiment of the floating head system according to the invention. Reference numeral 1 shows a disc of the floating head and the numeral 2 shows a magnetic head. This magnetic head 2 is secured to a fitting 4 through a supporting spring 3, and a slip surface 2' of the magnetic head 2 is made at an angle $\theta$ of inclination against the disc 1. The angle $\theta$ is very small, so that there is established a relation of $\theta=(h_2-h_1)/l$ and a mean gap $\bar{h}$ gaps $h_1$ and $h_2$ is expressed by $\bar{h}=(h_1+h_2)/2$.

FIG. 1B is a perspective view showing the detailed construction of the floating head system, and the floating head system is screwed in a fitting of a magnetic disc device at the portion of a notched hole 5' formed on a portion 5 secured to the fitting 4. In this embodiment, a slip surface 2' is prepared as an excellent flat surface in surface smoothness and in flatness, a supporting spring 3 is composed of a pair of leaf springs arranged on the same flat surface, and the angle $\theta$ of inclination between the disc 1 and the slip surface 2' is changed according to the deflection of the spring. When the disc 1 is rotated in the direction of an arrow A shown in FIG. 1A, a gap formed by the disc 1 and the slip surface 2' of the head 2 becomes a compression gap, lifting force is increased with increase of a relative speed, so that the gap h becomes larger, and thus signals having high frequency cannot be treated. Therefore, according to the present invention, the direction of rotation of the disc 1 is in the direction of an arrow B and an effect based on the expansion gap is utilized.

FIG. 2 shows an operational explanation of the floating head system according to the invention, wherein the abscissa is a relative speed v between the disc and the magnetic head and the ordinate is a mean gap $\bar{h}$ (here $\bar{h} = \frac{h_1 + h_2}{2}$).

When $v=0$, the mean value $\bar{h}$ is $h_0$. When the disc is started rotating and the speed v is gradually increased, the magnetic head is drawn to the disc against the supporting spring by the hydrodynamic attractive force effect on the expansion gap, and the mean gap $\bar{h}$ is decreased in proportion to the speed v such as A → B. When the magnetic head reaches the point B, the attractive force due to an air flow is rapidly increased so that the magnetic head is rapidly close to the disc up to a normal floating gap along B → C and becomes a floating state. When the speed v is further increased from the point C, the gap is slightly increased but does not have any influence upon recording and reproduction of a high frequency signal and thus a normal floating gap is substantially maintained (C → D). When the speed v is gradually decreased from the floating state, the gap is slightly decreased but a constant floating gap is substantially maintained until the speed becomes very low (D → E), and then the magnetic head is rapidly separated from the disc by force of the supporting spring immediately before stopping the rotation of the disc and is back to the original position (where the mean gap $\bar{h}$ becomes $h_0$) (E → A). That is, in the approaching stroke to the floating position and the separating stroke from the floating position, the hysteresis action (A → B → C → D → E → A) inclusive of the rapid approaching and separating actions such as B → C, E → A is formed. Such floating head system becomes a type of complete self-protection.

External force can be applied to the aforementioned magnetic head system. Such application will be explained with reference to FIG. 3.

FIG. 3 shows a change of the mean gap when the external force W is applied to the magnetic head, in which the speed of rotation of the disc is constant, the hydrodynamic attractive force at this speed is balanced with the spring force, and the magnetic head does not yet reach the point B shown in FIG. 2. In case that the speed v of rotation of the disc is constant ($\neq 0$) and the external force W is zero, the magnetic disc becomes stable at the point n where the mean gap $\bar{h}$ is $(\bar{h}_0-\delta)$. Here, $\bar{h}_0$ represents $v=0$, the mean gap in case of the speed $v=0$ and the external force $W=0$, and $\delta$ is a distance attracted against the supporting spring by the hydrodynamic attractive force when v is constant ($\neq 0$) and $W=0$. As shown in FIG. 1, if the external force W ($\neq 0$) is applied to the magnetic head, the gap is gradually decreased ($n \to p$), rapidly decreased ($p \to q$) at $W=\alpha$, and becomes a floating state. If the external force is further increased, the gap is decreased little by little ($q \to r$) and the disc is finally contacts the magnetic head at the point r. If the external force is decreased in the floating state at the point q, the gap is widened little by little ($q \to s$), and when the external force reaches negative force W $\beta$, the magnetic head is suddenly separated from the disc ($s \to t$) and restored to the point n by the spring force when the external force is released ($t \to n$). That is, the relation between the external force W and the mean gap $\bar{h}$ becomes a hysteresis characteristic of $n \to p \to q \to r \to s \to t \to n$.

The detailed numerical values for the floating head system including such external force are as follows. Assuming that the length $l$ and the width m of the magnetic head are $l=m=10$mm, $\bar{h}_0 \approx 0.3$mm, the spring constant of the supporting spring 600 gr/m, the relative speed of the head and the surface to be recorded about 13 m/s, and the angle of inclination proper degree $\theta$, the gap is almost linearly decreased to 10 and several $\mu s$ until $W=20$ gr, and rapidly decreased to 0.4 $\mu$ at $W=20$ gr. When the external force is further increased, the magnetic head contacts the disc at $W=530$ gr, and if the external force is decreased from this state, the gap is gradually increased even to less than 1 $\mu$ (the total is less than 1 $\mu$ from the point r to the point s shown in FIG. 3), and when the external force reaches −70 gr, the magnetic head is rapidly separated from the disc.

As is found from FIG. 3, if the negative external force is not applied but the external force is released after reaching the floating state at the point $q$ and the rate of rotation of the disc is lowered, the magnetic head maintains the slight gap and follows to the disc until the disc assumes a very low speed, and then the magnetic head is separated from its disc immediately before stopping the rotation, and restored to the position of $\bar{h}=\bar{h}_0$ when the rotation is stopped. Accordingly, in this case entirely the same separating action as in FIG. 2 is performed. That is, after the disc reaches a desired speed of rotation, the external force is slightly applied and the magnetic head is deviated to the position where the resultant force of the external force and the attractive force rapidly becomes larger than the spring force, so that there is exhibited the hysteresis characteristic as well as in FIG. 2 inclusive of the rapid attractive and separating actions in the approaching stroke to the floating position and the separating stroke from the floating position. The external force in this case is necessary for the approaching stroke but is not necessary for the floating state and the separating stroke. That is, the external force for deviating the magnetic head is applied only to the position of the point B shown in FIG. 2 where the hydrodynamic attractive force is rapidly increased. An approximate means for obtaining various conditions in order to make the hysteresis action possible in case such external force is used as a supplement to the approaching stroke will be explained later, but the range for obtaining these various conditions is wider than the case shown in FIG. 2.

FIG. 4 is a diagram showing a relation between the force effected on the magnetic head and the gap upon rotation of the disc at a constant speed. In FIG. 4, $F_1$ shows the hydrodynamic force effecting the magnetic head set at the gap of $\bar{h}_0$ when the relative speed $v=0$ accompanied with rotation of the disc. Further $F_2$ is the force due to deflection of the supporting spring, and in case external force $W=0$, the magnetic head becomes stable at the position of $\bar{h}'''$ where $F_1$ and $F_2$ are balanced with each other. When the external force $W_1$ is applied, the magnetic head becomes stable at the gap $\bar{h}'$ ($|F_1|=F_2=f'$) where the resultant force $F'_1$ of $F_1$ and $W_1$ is balanced with $F_2$. When the external force is further increased to be $W_2$, the resultant force $F_1''$ of $F_1$ and $W_2$ becomes larger than any $F_2$ between gaps, rapidly passes through the portion where the attractive force is rapidly increased, and moves to the normal floating gap $h''$ (the external force $W_2$ is applied to the rapid approaching stroke and released thereafter). When $|F_1|=F_2=f''$, the gap becomes $\bar{h}''$, and if the gap becomes widened, attractive force acts, while if the gap becomes narrow, floating force acts, so that the magnetic head becomes very stable in the normal gap $\bar{h}''$. The angle $\theta$ of inclination in this case is almost zero. This gap $\bar{h}''$ is a sufficient value to treat signals of the video frequency band, and when the relative speed is around zero, the magnetic head is separated from the disc and returned to the original position ($\bar{h}_0$). As a result, the disc and the magnetic head never contact each other.

The supplementary external force W during the approaching stroke to the floating state can be obtained by, for example, an electromagnet, but the external force W is not made extremely large against the spring force of the supporting spring nor instantaneous, because the speed during the approaching action is increased by applying instantaneously large external force and there is the possibility of striking the magnetic head against the disc with the force exceeding a limit of the floating force caused by the force $F_1$ effecting on the magnetic head. That is, the external force must be applied within the range that pushing force to the disc by the maximum oscillatory acceleration of the spring-mass system (determined by elasticity of the supporting spring and of the air layer and mass of the magnetic head) generated by the external force W and hydrodynamic attractive force do not exceed the maximum floating force of $F_1$. That is, the external force W must be increased in such a manner that the resultant force of $F_1$ and W maintains equilibrium with $F_2$ and gradually draws the magnetic head to the point P shown in FIG. 6 within the range in cooperating with the hydrodynamic attractive force. In addition, it is not necessary to dynamically apply the external force by means of an electromagnetic or the like, but the external force can be applied by a static means such as a stopper or a weight for previously positioning the magnetic head in order to make the gap of the point P (where the rapid approaching action is generated) shown in FIG. 3 determined by a relation with the relative speed.

The feature of the present invention which is essentially different from the action of a conventional floating head by means of a protective mechanism is that the protective action consisting of the rapid approaching action to the floating position and the rapid separating action from the floating position is carried out, inclusive of the case of requiring supplemental external force, only by an equilibrium relation force due to an air flow in the expansion gap composed of the magnetic surface of the disc and the magnetic head and the spring force for supporting the magnetic head.

The aforementioned supplemental external force is not changed in relation to the relative movement between the magnetic head and the magnetic surface to be recorded but it is an entirely supplemental external force for giving constant external force.

There has been proposed a floating head system having the slip surface of a magnetic head as a flat surface for actuating it under the floating state as well as the present invention, but in this case, such a floating head system cannot perform a protective action as in the present invention. That is, the floating state of such a magnetic head is generally maintained by an equilibrium relation between the pushing force to the disc surface by the supporting spring and the force due to the air flow generated between the disc and the magnetic head in relation to the relative speed, so that if the floating force due to the air flow is smaller than the spring force within the range of the relative speed, the disc contacts the magnetic head. As a means for avoiding it a special protective mechanism added thereto and the magnetic head is compulsorily approaches is and separated from the disc, to carry out the apparent protective action of a hysteresis characteristic like the present invention, but it is apparent that such operational principle is entirely different from the present invention. It is also applied to the magnetic head (used in the magnetic disc device for an electronic computer) having the spherical slip surface of a large radius of curvature. That is, the magnetic head is kept at the position for maintaining a gap sufficient enough not to contact the disc, and after the force due to the air flow reaches the relative speed which is larger than the force of the supporting spring, the external force is applied for making the floating state with the use of a protective mechanism such as an electromagnet or a motor different from the floating head mechanism, and when the relative speed is decreased to zero, the external force is released and separated at the proper time until the spring force becomes larger than the force due to the air flow. However, such protective action accompanies limits of the relative positions of the disc and the magnetic head by the external force to the approaching stroke to the floating state and the separating stroke from the floating state. As a result, the external force due to such protective action is essentially different from the external force $W_1$ and $W_2$ shown in FIG. 4 in object.

The magnetic disc has been explained in the foregoing, but the present invention can be applied to the magnetic drum. The embodiment of such magnetic drum is shown in FIG. 5. A slip surface 7' of the magnetic head 7 is made into a cylindrical surface having the same curvature as that of the magnetic drum 6. In the present embodiment, for the head system of the complete self-protective type without applying any external force thereto, there is exhibited the same hysteresis characteristic as in FIG. 2.

The conditions necessary for applying the aforementioned floating head system according to the present invention to the complete self-protective type can roughly be calculated as follows.

Figure 6B:
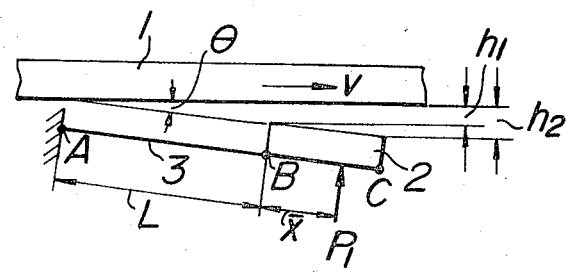

As shown in FIG. 6A, the flat magnetic head 2 having the length $l$ and the width $m$ is supported by the supporting spring 3 having the effective length L and the bending rigidity EI, and supposing that the angle of inclination upon stopping of the disc 1 is $\theta_0$, the minimum gap is $h_{10}$, the angle of inclination when the relative speed is $v$ as shown in FIG. 6B is $\theta$, the minimum gap is $h_1$, the attractive force is $F_1$, and the position of its acting point is $\overline{X}$.

In order to obtain an approximate value conventionally, let the fluid air be non-compressive, the attractive force $P_1$ based on the theory of the slider of infinite width is as follows.

$$P_1 = \alpha_p \frac{\mu v l^2 n}{h_1^2} cp \qquad (1)$$

wherein $cp = \frac{6}{(n-1)^2} \{ lnn - \frac{2(n-1)}{n+1} \}$.

Here, $\mu$ is a viscous coefficient, $\alpha p$ is a lateral leakage factor, a gap ratio $n$ is $h_2/h_1$, and $cp$ is an attractive force coefficient.

The action point $\overline{x}$ of an attractive force, i.e., the position of the pressure center $C_c$ becomes as follows.

$$x = C_c = \frac{(n+1)(n+3) \ln(n+1) - n(2.5n+3)}{n\{(n+2) \ln(n+1) - 2n\}} \qquad (2)$$

Figure 7:
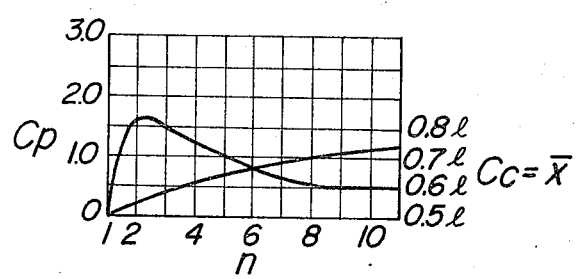
Figure 8:
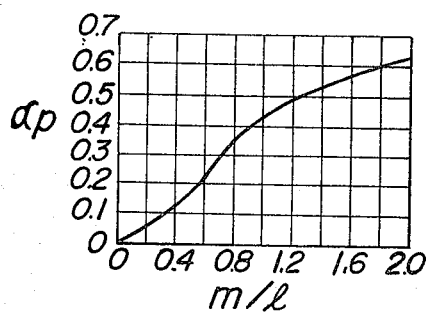

Further, let $Cp$ and $C_c$ be functions of n shown in FIG. 7, and $\alpha p$ is shown in FIG. 8. When the gap ratio n is obtained, $P_1$ and $\overline{x}$ can be sought from the equations (1) and (2).

As apparent from FIG. 7, when $n=1$, $\overline{x}$ is 0.5 and even if $n=3$, $\overline{x}$ is 0.6, so that there is almost no change. The time when the attractive force, i.e., the attractive force coefficient $cp$ becomes maximum is $n \approx 2.3$. As apparent from FIG. 8, the lateral leakage factor $\alpha p$ is about 0.45 when $m/l=1$.

When a deflection amount $\delta$ and a deflection angle $\overline{\theta}$ at the rear end point B (FIG. 6B) of the magnetic head 2 is considered, the initial fitting position of the magnetic head is so determined that the slip surface of the magnetic head and the surface of the disc are in parallel with each other when the magnetic head 2 is attracted and approached to the disc 1, the following equations (4) and (5) are obtained.

$$\theta = h_{10} = \frac{P_1 L^2}{EI} \cdot \frac{2L+3\overline{x}}{6}; \quad \theta = \theta_0 = \frac{P_1 L}{EI} \cdot \frac{L+2\overline{x}}{2} \qquad (4)$$

$$h_{10}/\theta_0 = L(2L+3\overline{x})/3(L+2\overline{x}) \qquad (5)$$

When $n=1-3$, there can be $\overline{x} \approx 0.51$, and in this case, the equation (5) becomes as follows.

$$\frac{h_{10}}{\theta_0} = \frac{2L}{3} \cdot \frac{1+\frac{3l}{4L}}{1+\frac{l}{L}} \qquad (6)$$

Therefore, it is understood that the magnetic head 2 should be fitted to satisfy the above equation (6). The gap ratio $n_o$ at this fitting position becomes as follows.

$$n_o = 1 + \frac{3l}{2L} \cdot \frac{1+\frac{2}{L}}{1+\frac{3l}{4L}} \qquad (7)$$

The attractive force $P_1$ is considered as the minimum at the original fitting position, and its initial value $P_{10}$ becomes as follows.

$$\left. \begin{array}{c} P_{10} = \alpha_p \dfrac{\mu v l^2 m}{h_{10}^2} C_{po} \\ C_{po} = \dfrac{6}{(n_o-1)^2} \{ lnn_o - \dfrac{2(n_o-1)}{n_o+1} \} \end{array} \right\} \qquad (8)$$

Accordingly, a proper value of $h_{10}$ is assumed and the magnetic head is secured to satisfy $\theta_0$ which is obtained from the equation (5), and if $P_{10}$ obtained from the equation (8) is larger than $P_1$ obtained from the first equation of the equation (4), there is carried out the action of drawing the magnetic head nearer to the disc. In fact, $P_{10}$ is effected on the spring to deflect it and the attractive force is gradually increased, so that it may be actuated without satisfying the above condition, but the necessary condition for the operation is roughly estimated from the above equation.

FIG. 9 is a graph showing a relation between $\theta_0$, $h_{10}$ and $v$ for carrying out the complete self-protective action experimentally obtained when $l=m=5$(mm), L=25(mm) and EI=4.6(Kg mm$^2$). For example, when the angle is inclination upon the resting of the disc is $\theta_0=0.5°$ and the minimum gap $h_{10}=50\mu$, if the relative speed $v$ reaches 6.6 m/s, the hysteresis action is carried out and the magnetic head comes close to the disc surface, and when $\theta_0=1.5°$ and $h_{10}=50\mu$, it is expressed to carry out the hysteresis action at $v=21.8$ m/s. Thus, if the action is once completed at $v$ corresponding to $\theta_0$ and $h_{10}$, even if the relative speed is increased or decreased within a wide range, the magnetic head never comes apart from the disc surface but maintains a certain gap constantly.

In this experiment, $m/l=1.0$, and thus $\alpha p=0.45$.

When $\theta_0=0.5°$ and $1.5°$, the value of $n$ is obtained by making $h_{10}$ acted by the value where $v$ is the least $50\mu$ and $100\mu$, respectively. As a result, $n \approx 2.0$ and $2.3$, so that it is understood that these n values fairly correspond to the maximum n value of $cp$ shown in FIG. 7. The left side values of the equation (6) in this case are as follows.

$$h_{10}/\theta_0 = 5.7, 3.8.$$

The calculated value at the right side of the equation (6) is 16.0.

Further, $P_1$ in the first equation of the equation (4) is $8.3 \times 10^{-5}$, $16.7 \times 10^{-5}$ Kg/mm² (values obtained by $\bar{x}=0.5l$) in relation to $h_{10}=50\mu$, $100\mu$, respectively, while $P_{10}$ obtained from the equation (8) becomes on the order of $10^{-3}$ Kg/mm², which is very larger than $P_1$.

That is, among the condition of $P_{10} > P_1$, the self-protective action can be completely performed when $P_{10}$ is very large as compared with $P_1$.

Concretely speaking, an experiment is carried out within the range of the following various numerical values and the complete self-protective function is confirmed.

Area of slip surface of magnetic head;
    $l \times m = 5 \times 5 - 10 \times 10$ (mm²)
Spring constant of supporting spring;
    $k = 0.25 - 60$ (gr/mm)
Angle of initial inclination;
    $\theta_0 = 0.5 - 1.5$ (degree)
Initial minimum gap;    $h_{10} = 50 - 300$ ($\mu$)
Maximum floating force due to deflection of supporting spring;
    less than 10 (gr)
Slider weight:    less than 4 (gr)

When the area of the slip surface of the magnetic head becomes very small, optimum $k$, $\theta_0$ and $h_{10}$ also become small, so that it becomes difficult to set the magnetic head at a proper state, while if the area becomes large, the flatness of the disc and the magnetic head is difficult to obtain, and it is difficult to maintain a certain gap, but even if the value other than the aforementioned experimental range is used, the complete self-protective action is theoretically possible.

The invention is not limited to the aforementioned basic example, but can be used in various modifications.

For example, the shape of the magnetic head is square in FIG. 1, but the hysteresis action is not fundamentally spoiled by the shape of the slip surface of the magnetic head, so that regardless of the shape of the magnetic head, when the gap, the angle of inclination, the area of the slip surface, the spring constant and the like are properly chosen in relation to the relative speed of the magnetic surface to be recorded, the hysteresis action can be obtained, so that the shape of the magnetic head is not limited to square.

Further, the magnetic head 2 shown in FIG. 1 is actually composed of a magnetic head as it is, or it is preferable to make the magnetic head as a slider and to mount it on the actual magnetic head, and a number of the magnetic heads can optionally be selected. In this case, the smaller the mass of the slider, the better the followability of the disc to the surface deviation, so that it is preferable to use a light weight and non-magnetic material such as aluminum alloy and the like as a slider.

The supporting spring can be not only moved vertically but also inclined to both sides to the disc in order to follow inclination in the radius direction of the disc surface, and as a result, it is a pair of leaf springs having a narrow width as shown in FIG. 1, but if the supporting spring can have the similar function, any shape can be used. For example, one sheet of the leaf spring is usable, and instead of the leaf spring any elastic wire such as a piano wire is also usable.

Further, in the aforementioned example, the case of providing the magnetic head under the magnetic disc is explained, but the reverse relation can be usable.

The fundamental explanation of the invention has been completed, and how to narrow the gap formed between the magnetic surface to be recorded and the floating head will be explained hereinafter. That is, in the aforementioned self-protective type floating head system, the gap formed between the magnetic surface to be recorded and the floating head during operation is about $1\mu$. However, for the recording and reproduction of signals of the video frequency band, it is desirable to improve the recording and reproduction function by shortening the gap.

In order to meet such requirements, the invention is to shorten the gap between the floating head and the surface of the magnetic medium by a large margin and to provide the floating head system which can improve the recording and reproduction capability.

The embodiment to satisfy such objects will be explained hereinafter. FIG. 10 is a fundamental explanatory view showing the construction and the action of the floating head system according to the invention in which FIG. 10A is a front view, and FIGS. 10B and 10C are side views thereof. As shown in FIGS. 10A and 10B, a magnetic head 11, a guide chip 12 and a slider 13 are internally mounted on a base plate 14, and the plate 14 is supported by a leaf spring 15. One end A of the leaf spring 15 is secured to determine the initial relative position with a disc 16 as shown in FIG. 10B. The angle of initial inclination of the slider 13 in this case is $\theta_0$, the initial minimum gap between the head 11 and the disc 16 is $h_{10}$, and the initial maximum gap is $h_{20}$. Since the areas of the magnetic head 11 and the guide chip 12 are very small as compared with that of the slider 13 having the length $l$ and the width $m$, the attractive force caused by the magnetic head 11 and the guide chip 12 is ignorably small. A difference $h_s$ between the heights of the base plate 14 and the slider 13 is made sufficiently large as compared with $h_{10}$ and $h_{20}$ (for the sake of clarity, the drawing is expressed in disregard of this relation) and the attractive force caused by the plate 14 is made small to be ignored against the attractive force caused by the slider 13. In such case, the approaching stroke of the slider 13 to the disc 16 from the initial relative position is the same as the aforementioned floating head system.

FIG. 10C is an explanatory view showing a relation of the relative position upon the floating action of the head. The slider 13 provided on the base plate 14 forms a first flat surface, and this flat surface is inclined to the disc 16 at the angle $\theta$, the minimum gap $h_1$ and the maximum gap $h_2$, and to this slider 13 is effected the attractive force $P_1$ caused in accordance with the speed $v$ of rotation of the disc 16. The gaps $h_1$ and $h_2$ are values in the viscous flow region. In this case, there is formed a slight gap of $h_f$ between a second flat surface inclusive of each end flat surface of the magnetic head 11 and the guide chip 12 (end flat surfaces of the magnetic head 11 and the guide chip 12 are on the same flat surface, respectively, and they are the second flat surfaces) and the surface of the disc 16, so as to stably float the head in a parallel position to the disc 16 by maintaining a slight air layer. A flow of the air in this slight gap $h_f$ is not a conventional viscous flow but belongs to the region of a slip flow. Actions of the magnetic head and the guide chip upon this floating action are the same as that of the head system of the conventional type, and an action of the slider 13 is considered entirely the same as that of the conventional supporting spring which pushes the head and the chip against the disc. In this condition, there is maintained equilibrium between the attractive force $P_1$ due to the slider 13, the floating force ($P_2+2P_3$) due to the magnetic head 11 and the guide chip 12 and the returning force $P_4$ due to the deflection of the spring 15, so as to maintain stability of the gap $h_f$.

In the stroke of gradually decreasing the speed $v$ of rotation of the disc 16 to stop, $P_1$, $P_2$ and $P_3$ are gradually decreased and its resultant force becomes smaller than $P_4$, so that the head is returned to the original position (state shown in FIG. 10B) by the spring force. In this case, the magnetic head 11 and the guide chip 12 are effected as a flat slider, so that if $h_f$ tries to be large, the attractive force is generated. By this amount, the attractive force of the slider 13 is compensated, and as well as the aforementioned floating head system, the hysteresis characteristic is held in the approaching stroke and the separating stroke. That is, it means that the speed $v_2$ upon the separating action is smaller than the speed $v_1$ of rotation of the disc 16 upon the approaching action.

As described above, the floating head system according to the present invention is actuated by a combination of a pressure generating phenomenon in the viscous flow region and a pressure generating phenomenon in the slip flow region, and different from the prior floating head system, the slider 13 remains at the position of the expansion gap formed by the slider 13 and the disc 16 (the gap is expanded in the direction of rotation) upon the floating action, that is, the invention differs from the prior art in the point of the simultaneously acting pressure generating phenomenon of the viscous flow and the slip flow. Here, supposing that the initial attractive force $P_{10}$ is larger than the spring force $P_s$ to perform the approaching action, the condition thereof is obtained as follows.

$$P_s = \frac{EIh_{10}}{L^2} \cdot \frac{12}{4L+3l} \leq P_{10} = \alpha P \frac{\mu v l^2 m}{h^2_{10}} C_{\nu o} \quad (9)$$

Here,
EI = bending rigidly of spring 15
$\alpha p$ = lateral leakage coefficient
$\mu$ = viscous coefficient of fluid
$C_{po}$ = coefficient of attractive force at first fitting As a result, the spring 15 is secured for satisfying the following equation (10).

$$\frac{h_{10}}{\theta_0} = \frac{2L}{3} \cdot \frac{1+\frac{3l}{4L}}{1+\frac{l}{L}} \quad (10)$$

The attractive force $P_1$ effected on the slider 13 at the floating action becomes as follows.

$$P_1 = \alpha_P \frac{\mu v l^2 m}{h^2_{10}} C_{\nu 1} \quad (11)$$

(wherein $C_{pl}$ is an attractive force coefficient at the floating action.) When the gap ratio is $n = h_2/h_1$, $C_{pl}$ is obtained by the following equation.

$$C_{\nu 1} = \frac{6}{(n-1)^2} \left\{ lnn - \frac{2(n-1)}{n+1} \right\} \quad (12)$$

As described above, if the equations (9) and (10) are satisfied, when the disc 16 is started to rotate and reaches a given relative speed, it becomes possible that the slider 13 automatically approaches the disc 16, and from the equations (11) and (12), there is determined the attractive force (acted as a pushing force to the end flat surfaces of each chip) due to the slider 13 when each chip 11 and 12 is floated in the slip flow region.

FIG. 11A is a perspective view showing an embodiment of the floating head system based on the invention in detail, and FIG. 11B is a side view showing the floating head system at the floating action. One end of the leaf spring 15 is secured to a metal fitting 17, and lead wires 19 of the magnetic head 11 are connected to terminals 18. The size of the slider 13 is $l=5.5$mm, $m=5$mm, and as a leaf spring 15, use is made of flat trapezoid type spring having the length $L_1$ lacking the end of the parallel beam (length with lacking the end is $L_2$). Further, the coupling point of the spring 15 corresponding to the point B shown in FIG. 10B and the base plate 14 is positioned at the acting point of the resultant force of the floating forces effected on the magnetic head 11 and the guide chip 12 as shown in the point B of FIG. 11B. In this case, $P_s$ at the left side of the equation (9) becomes as follows.

$$P_s = \frac{2EI_0}{L_2} \cdot \frac{h_{10}}{L^2_1} \quad (13)$$

Therefore, $$\delta = h_{10} = \frac{P_s L_2}{2EI_0} L^2_1 \quad (14)$$

Here, $\delta$ is the displacement amount of the point B of the spring from the initial fitting position to the floating position. The initial angle of inclination $\theta_0$ is obtained from the following equation when the has leaf spring has same strength as the beam having the width $b_0$ of the fixed end, the width $b_1$ of the free end, the length $L_1$ and the plate thickness $t$ (uniform thickness) as shown in FIG. 12.

$$\theta_0 = \frac{P_s L_2}{EI_0} L_1 \quad (15)$$

In this case, the equation of the initial fitting condition becomes as follows.

$$\frac{h_{10}}{\theta_0} = \frac{L_1}{2} \quad (16)$$

As described above, if the system is designed in accordance with the shape of a leaf spring, the condition for making the protective action possible can be obtained in the same manner as in the equations (9) and (10).

In the detailed embodiment shown in FIG. 11, $L_r$=19mm, and if $h_{10}$=0.6mm, $\theta_0$=0.063 radian from the equation (16), i.e., $\theta_0$=1.1°. The spring force $P_s$ in this case is 0.05 gr (about 0.054 gr at actual measurement from the equation (13), and when $P_{10}$ is sought from the right side of the equation (9), it becomes 0.077 gr (v-20 m/second) and satisfies the condition $P_s<P_{10}$ of the equation (9), so that the floating head can perform the approaching action. In practice, when $P_{10}$ acts to deflect the spring, the attractive force $P_1$ is gradually increased, so that even if the initial gap is larger than $h_{10}$=0.06mm, the action is possible.

The floating action in the slip flow region is experimentally known, and in an embodiment of the three point support consisting of one magnetic head having the area opposite to the disc of 0.06mm×1.2mm and two guide chips of 0.6mm×0.6mm, when the pushing force of about 2 gr (corresponding to $P_1$) is applied to the acting point of the resultant force of the floating forces effected on the magnetic head and the guide chips, it becomes $h_f \approx 0.2\mu$.

In the separating stroke from the disc 16, the attractive force (pushing force) $P_1$ is decreased in proportion to the decrease of the relative speed $v$, but the attractive force is generated in the magnetic head 11 and the guide chip 12 at the slip flow region, so that $h_f$ is scarcely changed and maintains almost uniform positional relation with the disc 16. Further, when the relative speed is decreased and the sum of the attractive force $P_1$ and the attractive forces generated in the magnetic head and the guide chip becomes smaller than that of $P_s$ and the weight of the floating portion, the magnetic head is rapidly separated from the disc and retracted to the original position.

A difference $h_s$ (shown in FIG. 10B) between the slider 13 and the plate 14 is 0.3 mm, which is considerably larger than the aforementioned $h_{10}$=0.6mm, so that there can be ignored any influence of the hydrodynamic function of the plate 14 on the total operating stroke. The surfaces of the magnetic head 11 and the guide chip 12 are arranged on the same plane by taking the three point support structure which is most stable to keep the magnetic head 11 in parallel with the disc 16 at the floating action. The floating force and the attractive force generated by a flow the slip flow region in accordance with a slight change of the gap $h_f$ at the floating action are very large as compared with a change of the attraction force due to a flow of the viscous flow region caused by a change of the gap of the same quantity, to smoothly follow the vertical movement of the disc by means of rotation, to maintain uniform $h_f$ and to stably operate the system.

The leaf spring shown in the embodiment is of a pinnacle in order to correct falling of the plate 14 at the cross section in the direction at a right angle with the direction of rotation by the deflection of the leaf spring 15. A rotating moment to the plate 14 is generated by lowering the slider by the floating action based on the positional precision of the magnetic head, each chip and the slider, so that it is necessary to determine the positional precision within the range where a difference of the pushing force due to the rotating moment is permitted by the magnetic head and each chip. In the present embodiment, if the pushing force effected on the guide chips 12 at both sides can be permitted within the allotment of 1:2, the value of $h_1$ at both ends of the slider 13 can be permitted within the range of 8-12$\mu$, about 10 $\mu$.

In case any oscillation is applied by transportation and the like under the initial state, there is caused an oscillation determined by the mass of the floating portion and the leaf spring and these oscillations strike the surface of the disc 16, so that as shown in FIG. 10B, it is necessary to limit free oscillation by providing a stopper 20 in contact with the plate 14 at the initial state.

As the simplest method for setting the initial fitting position, the metal fitting 17 is secured to secured to a stand which can adjust the height of the rotation axial direction of the disc, the inclination of the direction of the disc rotation, and the inclination of the direction at a right angle with the direction of the disc rotation, respectively, so as to adjust each inclination of $h_{10}$, $\theta_0$ and the direction of the disc rotation to predetermined values. As another method for setting the initial position there is a method in which the metal fitting 17 and the plate 14 are previously set against the relative position and assembled, and the relative position of the metal fitting 17 and the disc 16 is further controlled, that is, a method of providing a fitting standard. Further, there is a compromise of these methods, that is, a certain precision is maintained by the fitting standard and fixed, and then a fine adjustment is performed to obtain the best operation.

An embodiment of the floating head system having the three point supporting structure consisting of one magnetic head and two guide chips shown in FIG. 11 has been described in detail in the foregoing. For the three point supporting structure, it is apparent that it can similarly be applied to a combination of two magnetic heads and one guide chip or a combination of three magnetic heads. Further, the shape of the slip surface of the slider 13 is not limited to a rectangle, but similarly designed as well as the aforementioned embodiment with the use of a calculation corresponding to the equations (9) and (11), In the same manner as the structure of a plurality of supports other than three points, embodiments of one point, two point and four point supporting structures are shown in FIG. 13.

In FIG. 13, the reference numeral 21 is a sliding surface to be floated in the slip flow region, the numeral 22 a slider surface attracted and actuated in the viscous flow region, the numeral 23 a base plate, and the numeral 24 a leaf spring. FIG. 13A shows a floating head system having a one point supporting structure, wherein a plurality of magnetic heads can be arranged on the same plane with the sliding surface 21 or laminated multi-channel heads. FIG. 13B shows a floating head system having a two point supporting structure, wherein the magnetic head can be arranged on any plane if it is in the sliding surface 21. FIG. 13C shows a floating head system having a four point supporting structure. In this case, each sliding surface 21 can be arranged at any place. That is, in a plan view at the lower side of FIG. 13C, two upper sliding surfaces and two lower sliding surfaces are arranged on the same circumference, but they can be arranged in zigzag form or plateau form. It can be the same as in a multipoint supporting structure.

In various embodiments mentioned in the foregoing, it becomes clear that if a certain curvature is given to the sliding surface and the slider surface, the magnetic head system according to the invention can be applied to the magnetic drum.

The hysteresis characteristic appeared on the approaching action of the magnetic head system from the initial fitting position to the disc and the separating action from the disc differs by the area of the sliding surface operated in the slip flow region. FIG. 14 is a characteristic view showing this phenomenon. In case the area of the sliding surface is uniform, the larger the area of the sliding surface, the closer the disc speed v for starting the separating action to the zero point, while the smaller the area of the sliding surface, the closer the disc speed v for starting the separating action to $v_1$. It means that the smaller the sliding surface, the smaller the action in the slip flow region.

In order to minimize the influence of inertia of the floating portion in the approaching stroke and the influence of inertia due to oscillation of the disc surface during the floating action, it is preferable to make the weight of the floating portion as light as possible.

In the embodiment shown in FIG. 13, the slider and the base plate are integrated, and the magnetic head is assembled therewith. Accordingly, any combination can qualitatively be employed. In the present embodiment, the material a slider and base plate is selected by considering that even if dust and dirt in the air are flowed, the material is not injured, and the material is provided with simultaneous workability with the magnetic head capable of correcting and processing the same surface of the magnetic head.

Further, the spring for supporting the floating head requires a very slight amount of bending, so that stress due to the bending is very small and fatique breakdown due to repetition is scarce, and as a result, the spring can be manufactured from a common spring material.

Next, the features concerning improvement of recording capability by moving the floating head according to the invention parallel to the magnetic surface to be recorded will be explained.

Figure 15:
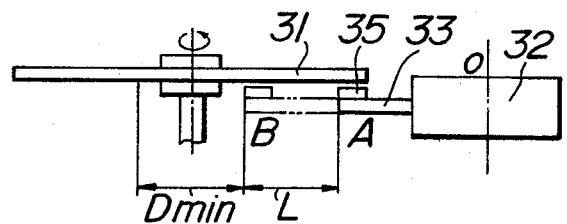
FIG. 15 is a side view showing a fundamental construction of the magnetic recording and reproducing device according to the invention.

FIG. 15 is a side view showing the fundamental constructional embodiment of the magnetic recording and reproducing device according to the invention. That is, the magnetic recording and reproducing device in the present embodiment comprises a magnetic disc 31, a positioner 32 (any type is usable), and a floating head 35 having a self-protective function mounted on a leaf spring 34 (refer to FIG. 17) secured to an arm 33 of the positioner 32 by extending in the vertical direction shown in FIG. 15 in the case of the present embodiment.

Figure 16:
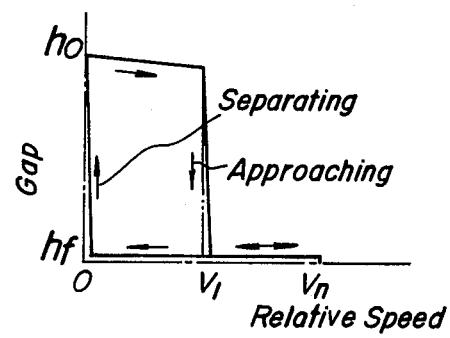
FIG. 16 shows operational view of the super floating head used in the device according to the invention.

The operation of a super floating head used in the magnetic recording and reproducing device according to the invention is explained with reference to FIG. 16. In FIG. 16, the abscissa shows a relative speed between the magnetic disc 31 and the super floating head 35, and the ordinate shows the gap between these elements 31 and 35. The super floating head is fairly apart from the disc surface at a distance ($h_0$) when the magnetic disc is at rest, but when rotation is started and the relative speed reaches $v_1$, the super floating head rapidly approaches the magnetic disc by a hydrodynamic action and floats with a floating gap $h_f$. In the floating state, even if the relative speed is varied, the floating gap $h_f$ is scarcely varied, but a large hydrodynamic action is effected corresponding to a slight change of $h_f$, so that $h_f$ is kept uniformly. Therefore, the super floating head having good followability to vertical oscillation of the disc surface can maintain a stable position even if an access action is rapidly given to the radius direction of the magnetic disc. The relative speed is gradually decreased during the course of stopping the magnetic disc and just before completely stopping the magnetic disc, the super floating head is separated from the magnetic disc and returns to the original position (gap $h_0$). As a result, the super floating head is not in contact with the magnetic disc through the whole action. The action of approaching the super floating head to the magnetic disc at the relative speed $v_1$ and the action of separating the super floating head from the magnetic disc just before stopping the magnetic disc are the protective action itself for preventing conventional contact with the floating head. When the minimum value of the constant speed $v_m$ determined by the rotational speed of the magnetic disc and the diameter $D_{min}$ (operational arm position B) of the inner most peripheral track shown in FIG. 15 is larger than $v_1$, wherever the super floating head is positioned, the aforementioned self-protective action becomes possible.

Figure 17:
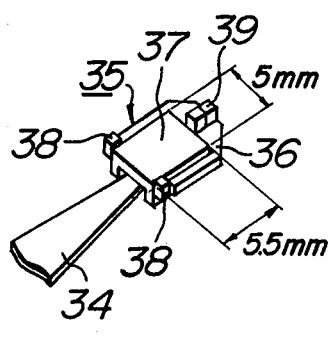
FIG. 17 is a perspective view showing one design of the floating head in detail.

FIG. 17 shows a detailed embodiment of the super floating head used in the magnetic recording and reproducing device according to the invention. That is, the super floating head 35 supported at a free end side of the leaf spring 34 comprises a base plate 36 supported by the leaf spring 34, a slider 37 mounted on the plate 36 for setting a first plane, two guide chips 38 mounted on the plate 36 for setting a second plane, and one head chip 39. The slider 37 is, for example, 5 mm in width and 5.5 mm in length. In this embodiment, under the conditions of $h_0 \approx 0.1$ mm and $v_1 \approx 5$ m/second, the head chip comes close to the magnetic disc and enters the floating state. The floating gap in this case is $h_f = 0.2$–$0.3\mu$ and it hardly varies even if the relative speed is varied from 10 m/second to about 75 m/second. During the course of stopping the magnetic disc, if the relative speed is decreased to about 0.5 m/second, the head chip is separated from the disc and returns to the original position.

When the aforementioned super floating head is used, a desired floating gap is maintained within the range of the relative speed of 32–75 m/second in the case of broadcasting and of 10–75 m/second for each kind of magnetic discs in the case of electronic computers. Further, in the magnetic disc device for a still picture broadcasting receiver, a desired floating gap is maintained within the range of the relative speed of 15–25 m/second. As a result, it is confirmed that an applicable range of the super floating head is very wide.

On the basis of the aforementioned description, the fundamental construction of the magnetic recording and reproducing device according to the invention will be explained.

In FIG. 15, when the magnetic disc 31 is stopped, wherever the super floating head 35 is positioned within the access range L of the operating arm 33, the super floating head 35 is apart from the magnetic disc 31. Accordingly, it is not necessary to separate the magnetic head 35 from the magnetic disc 31 far outside of the outermost peripheral track position A. In order to exchange the super floating head and the magnetic disc, it is designed to rotate the whole positioner mechanism about the position 0. When the magnetic disc 31 starts to rotate and to reach a speed $v_1$ and the super floating head 35 rapidly comes close to the magnetic disc 31 to the floating state, the access action immediately becomes possible. The access action at the constant rotation and the recording and reproducing functions are entirely the same as conventional ones. After being operated, whenever the super floating head is positioned within the disc surface, if the rotation of the magnetic disc 31 is stopped, just before it is completely stopped the super floating head 35 is separated from the magnetic disc 31 and returned the original position (gap $h_0$).

As to the access action of the super floating head, with the use of a positioner having properties of about 50 mm of the maximum moving distance, 80 mmsec of maximum access time, and 8 mmsec of minimum access time, a random access action of the system shown in FIG. 17 is repeatedly tested, and it is confirmed that no abnormality is generated in either the magnetic disc or the super floating head. The relative speed is fixed to about 70 m/second and the starting and the resting of the magnetic head are repeated, but the protective action of the super floating head is securely carried out, and no obstacle is caused in either the head chip or the magnetic head. As to a low speed, the relative speed of 20 m/second as a basis is tried and gives good results. Thus, the protective action of the super floating head is positively obtained within the wide range of the relative speed. That is, the present invention can be applied to every possible devices from the magnetic recording and reproducing devices having high efficiency and multi-tracks (several hundred tracks) for broadcasting, to the simple miniature magnetic recording and reproducing devices having several tracks for domestic use which does not require any high efficiency.

Figure 18:
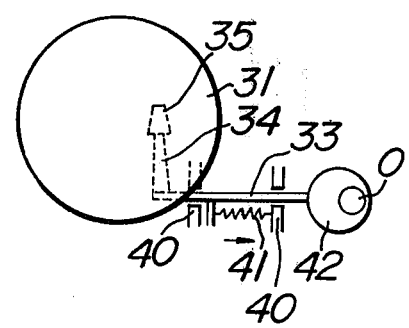
FIG. 18 is a plan view showing a simplified embodiment of the magnetic recording and reproducing device according to the invention.

In FIG. 18 is shown one embodiment of the simple magnetic recording and reproducing device according to the invention. In this embodiment, elements corresponding to FIGS. 5 and 7 are designated by the same reference numerals in the case of FIGS. 15 and 17. The super floating head 35 supported by the leaf spring 34 is secured to the operating arm 33, and the arm 33 is laterally and movably supported by the bearing device 40. A spring 41 is provided between the arm 33 and the bearing device 40, a function of the spring 41 is always effected on the arm 33 in the direction of an arrow, and the arm 33 is in contact with the outer periphery of a cam 42 rotated and driven by a rotary electromagnet of a stepping type about the axis 0 of the rotary center. Therefore, the radius of the cam 42 at the contact with the arm 33 is varied, so as to determine the movement to both sides and the positioning of the super floating head 35 by a difference of the radius. Further, as a simple method, the axis 0 of the rotary center can manually be operated by a knob of a click-stop mechanism. In addition, various methods can be applied as in a simple movement and positioning mechanism, but any mechanism can be used.

Further, as a method for exchanging the magnetic disc and the super floating head, the rotary type is explained in FIG. 15, but the whole positioner mechanism can be of a drawing type or a moving type, and such exchange method is not restricted as well as the positioner system.

Therefore, according to the present invention, there are many advantages as follows.

1. The gap between the magnetic drum and the magnetic disc and the magnetic head can possess the hysteresis characteristic, so that the complete self-protective function can be maintained and the gap during operation becomes a sufficiently small value to treat a signal in the video frequency band.

2. During operation, a large attractive force or a floating force acts against slight variation of the gap, so that the magnetic head is very stable and followable to the disc and magnetic drum surface.

3. The construction of the floating head is very simple and reliable, so that there is required no complicated protective mechanism having a direct relation with the gap during floating as in the conventional systems.

4. Even in case of any unforeseen accident such as power service interruption or the like and the magnetic disc is stopped, there is no anxiety, since there is required no special protective action, and the protective mechanism and the protective circuit can be simplified.

5. The floating gap during the floating action can be made very much smaller than that in a conventional viscous flow region, e.g., $0.2\mu$, so that signals of a high frequency band can be treated and recording density can be increased. In this case, pressure generated in accordance with slight variations of the floating gap is very large, so that an interval of the gaps can uniformly be maintained. Further, the followability to oscillation of the disc generated by rotation is excellent.

6. In case the floating gap is very narrow as described above, an area of the sliding surface floated and acted by maintaining the gap to the disc surface is very small, so that occurrence of an injury made by dust and dirt in the air is decreased, since even if it is passes over dust and dirt, the smaller the area of the sliding surface, the smaller the function for maintaining the gap uniformly, and any damage is mitigated by widening the gap.

7. Further, in the above case, the relative positional relation of the slider, the magnetic head and the guide chip is adjusted when they are assembled, so that each unit processing is easy. Further, the slider portion maintains a fairly wide gap to the disc surface, so that whatever material is used, there is no damage. The magnetic head and the guide chip material which is hard to be damaged can be selected and used. Further, since the sliding surface is on the same plane, even if uneven difference is caused during assembling, it is easy to correct and process by a particle grinding processing.

8. Next, in the case of combining the complete self-protective floating head with the driven device for movement, when starting and stopping the magnetic disc, it is not necessary to determine the head position contrary to a conventional slow motion video recorder for broadcasting. Further, there is no need to draw out the head as with the buffer memory for an electronic computer nor to separate from the disc surface. To that extent, the action is simplified and the position control circuit and mechanism can be simplified.

As a concrete embodiment for applying the invention, there are not only magnetic disc devices and slow motion video recorders for broadcasting and the like, but also all magnetic disc devices which require the access action, for example, memory for still picture broadcasting, video memory for editing, file memory for information and the like. Further, the invention can be applied to each kind of buffer memories for electronic computers and to domestic use in future. Thus, the invention is widely applicable.

Further, the idea and the construction of the invention can be applied to an automatic sizing device such as rolling, cylinder grinding and the like of a sheet member.

The invention can be applied to a moving speed detecting device. That is, a strain gauge is mounted on the floating head supporting spring, and a relation between the strain of the supporting spring and the relative speed is previously corrected and obtained under the state of not adding any outer force. This moving speed detecting device can be modified into an alarm device or a protective device for detecting a limit speed such as a rotary body and the like.

The invention can be applied to a magnetic drum device, so that when it is applied to a magnetic drum device which requires the access action, an effect and advantage similar to the magnetic disc device can be obtained. In this case, as well as the disc, it can be applied to any kind of access system.

What is claimed is:

1. A floating head system for holding a magnetic head on a magnetic surface of a magnetic recording medium by means of a supporting spring in a non-contact state, comprising a supporting spring secured at one end to a fitting and free at the other end; a magnetic head secured to the free end of the spring and located opposite a magnetic surface recording of a medium to be recorded; first means formed by an inclined sliding surface of the magnetic head defining a wedge-shaped gap increasing in the direction of movement of said magnetic surface to be recorded for linearly decreasing its inclination and the relative distance between the sliding surface of the magnetic head and the magnetic surface by varying equilibrium between a negative force of an air flow and a positive force of the supporting spring making larger air pressure than the spring force during approach of the head to the magnetic medium while the relative speed between the sliding surface of the magnetic head and the magnetic surface increases from the resting state almost to a first critical speed; second means for balancing the force caused by the air flow and the force caused by the supporting spring by destroying the equilibrium between the force of the air flow and the force of the supporting spring when said relative speed reaches said first critical speed, by rapidly increasing the force caused by the air flow, thereby rapidly reaching a normal distance between the sliding surface and the magnetic surface; third means for linearly decreasing said relative distance to reach close distance to the magnetic surface by gradually changing the equilibrium between the force of the air flow and the force of the supporting spring when said relative speed is decreased to a second critical speed smaller than the first critical speed afyer said relative distance reaches the normal distance; and fourth means for retracting said sliding surface to the resting state by destroying the equilibrium between the force of the air flow and the force caused by the air flow at the second critical speed just before said relative distance becomes zero, whereby the approaching stroke to a floating position and the separating stroke from a floating state exhibit a hysteresis characteristic, automatically preventing contact between said sliding surface and the magentic surface thereby protecting both surfaces.

2. A floating head system as claimed in claim 1, wherein the floating head is coupled to a head driving mechanism which comprises an operating arm movable in parallel along the surface of the magnetic medium and supported by a bearing device, an eccentric cam mechanism, and a spring for contacting one end of the arm with the eccentric cam at all times whereby the traveling distance and the position of the arm are defined by the eccentric amount and the rotation angle of the cam.

3. A floating head system as claimed in claim 1, wherein a base plate for the floating head is secured to a free side of an end of an elastic body secured at one end and free at the other end, on the base plate are carried a slider defining a first plane and a plurality of projections having flat ends defining a second plane, said first plane intersecting said second plane at a point of extension of these planes, at least one of these projections being provided with a magnetic head.

4. A floating head system as claimed in claim 3, wherein the floating head is coupled to a head driven mechanism which comprises an operating arm movable in parallel along the surface of the magnetic medium and supported by a bearing device, an eccentric cam mechanism, and a spring for contacting one end of the arm with the eccentric cam at all times whereby the traveling distance and the position of the arm are defined by the eccentric amount and the rotation angle of the cam.

* * * * *